No. 614,021. Patented Nov. 8, 1898.
C. OAKFORD.
TIRE TIGHTENER.
(Application filed Sept. 1, 1897.)
(No Model.)
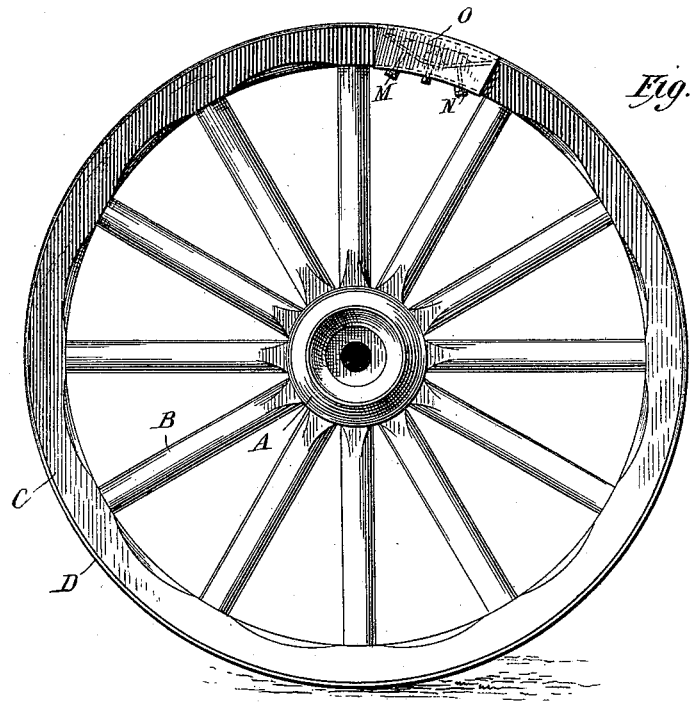
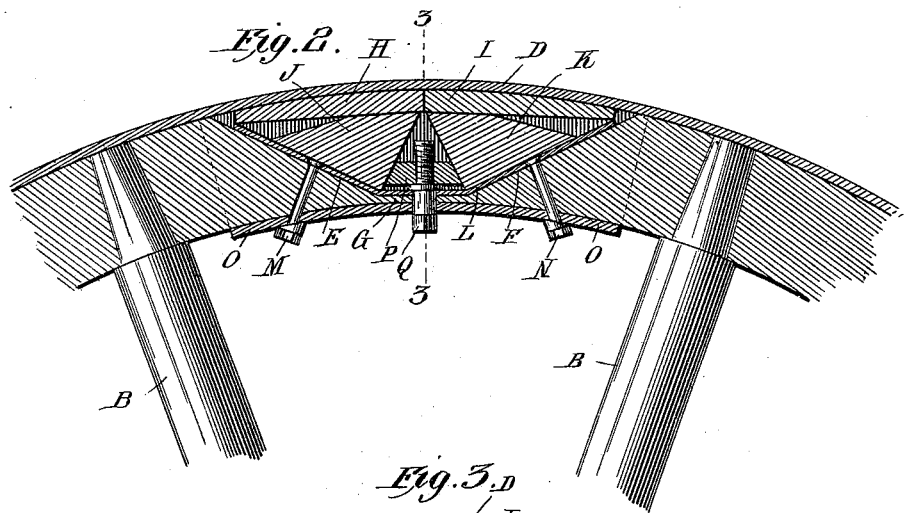
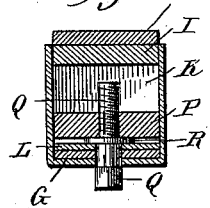
Witnesses
Inventor
Charles Oakford,

UNITED STATES PATENT OFFICE.

CHARLES OAKFORD, OF HIGHLAND, FLORIDA.

TIRE-TIGHTENER.

SPECIFICATION forming part of Letters Patent No. 614,021, dated November 8, 1898.

Application filed September 1, 1897. Serial No. 650,281. (No model.)

*To all whom it may concern:*

Be it known that I, CHARLES OAKFORD, residing at Highland, in the county of Clay and State of Florida, have invented a new and useful Tire-Tightener, of which the following is a specification.

My invention is in the nature of a wheel provided with means for tightening the tire thereof.

The object of my invention is to provide means which may be cheaply and easily attached to or secured upon a wheel, whereby the tire may be quickly and easily tightened without removing it from the wheel and without even removing the wheel from the wagon.

With this object in view my invention consists in the improved construction, arrangement, and combination of parts hereinafter fully described and afterward specifically pointed out in the claims.

In order to enable others skilled in the art to which my invention most nearly appertains to make and use the same, I will now proceed to describe its construction and operation, reference being had to the accompanying drawings, forming part of this specification, in which—

Figure 1 is a side elevation of a wheel to which my invention is applied. Fig. 2 is a fragmentary detail view showing a section through the expanding mechanism. Fig. 3 is a transverse section on the line 3 3 of Fig. 2.

Like letters of reference mark the same parts wherever they occur in the different figures of the drawings.

Referring to the drawings by letters, A is a hub, B are the spokes, C is the rim, and D is the tire, of any ordinary wheel, such as are used upon carts, wagons, &c.

A portion of the rim is cut away, leaving the inclined ends E F facing each other, the space thus made extending nearly to the inner side of the rim, leaving a thin portion G in the center. In the space left by thus cutting the rim away and immediately adjoining the tire D are two blocks H and I, formed on their outer sides to fit the curvature of the tire and bear against the inner side thereof. These blocks, together with two blocks J and K, also placed in the cut-away space, will preferably be made of metal or other hard material. The blocks J and K are substantially triangular in shape, the only variations from the triangle being the slight bend in the outer sides of the blocks, one-half of which sides bears against the inner sides of the blocks H and I, while the inner sides of the triangular blocks J and K bear against this metal plate L, which lines the interior of the space made by cutting away the rim. This metal lining L is connected, by means of bolts M and N passing through it and the rim, with a box or case O, which embraces the cut portion of the rim, extending along the outside of both sides and the inner ends of the rim, inclosing all the operative mechanism of my invention, the bolts serving to hold this casing in position. The inner faces of the blocks J and K are inclined toward each other and form the wedge-shaped space, in which is seated the wedge P, also made of metal and provided with a threaded opening to receive a bolt Q, which passes through the inner portion G of the rim, the plate L, and the casing O, the head of the bolt projecting through the casing to facilitate the application of a wrench for turning it.

A collar R on the bolt rests against the inside of the plate L, against which it bears when the bolt is turned to force the wedge outwardly between the blocks J and K.

In the operation of my invention when it is desired to expand the tire it is only necessary to place the wrench upon the head of the bolt Q and turn it to the right, which will cause the wedge P to move outward and force the outer sides of the blocks J and K against the inner sides of the blocks I and H, which in turn forces that section of the tire outward, causing the tire to bind tightly upon the rim of the other sections of the wheel, the plate L forming a solid bearing, against which the collar R of the bolt Q turns during the operation.

When the wheel has been supplied with one or more of these tire-expanding devices, it is only necessary, in order to keep the tire always tight, to turn the screw-bolt slightly from time to time as far as may be necessary, thus forcing the wedge in the wedge-shaped space between the blocks J and K, forcing the blocks H and I outward, and consequently tightening the tire.

The advantages attending the use of my invention are numerous and will be obvious from the foregoing description. Where wheels are provided with my improved expanding mechanism, the expense of numerous visits to the blacksmith to have the tires cut, to say nothing of the time lost in making such trips, is entirely obviated and many times the cost of the device is saved during the lifetime of the wheel.

While I have illustrated and described the best means now known to me for carrying out my invention, I do not wish to be understood as restricting myself to the exact details of construction shown and described, but hold that any slight changes or variations, such as might suggest themselves to the ordinary mechanic, will properly fall within the limit and scope of my invention.

Having thus fully described my invention, what I claim as new, and desire to secure by Letters Patent of the United States, is—

1. The combination in a wagon or other wheel of a rim cut away and having inclined ends, blocks having their outer sides curved, to conform to the tire, seated in the cut-away space, triangular-shaped blocks inside the curved blocks having a wedge-shaped space between them, a wedge in said space, and an adjusting screw-bolt threaded in the wedge and projecting through an opening in the inner side of the rim, substantially as described.

2. The combination in a wagon or other wheel of a rim cut away leaving a space with inclined ends, curved blocks seated in said space bearing against the inside of the tire, triangular blocks inside of the curved blocks and having a wedge-shaped space between them, a wedge located in the wedge-shaped space between the triangular blocks, a metallic plate forming a lining for the interior of the cut-away space of the rim, a metal box or casing inclosing the rim and actuating mechanism before described, an adjustable screw-bolt threaded in the wedge and projecting through the metallic lining, the rim and the casing, and screw-bolts passing through the rim and connecting the metallic lining with the outer box or casing, substantially as described.

CHAS. OAKFORD.

Witnesses:
H. H. POLLARD,
W. E. WALKER.